United States Patent [19]

Manin

[11] Patent Number: 4,852,004
[45] Date of Patent: Jul. 25, 1989

[54] METHOD AND APPARATUS FOR PROCESSING SEISMOGRAPHIC DATA BY CORRELATION

[75] Inventor: Michel Manin, St Arnoult en Yvelines, France

[73] Assignee: Compagnie Generale de Geophysique, Massy, France

[21] Appl. No.: 57,538

[22] Filed: Jun. 2, 1987

[30] Foreign Application Priority Data

Jun. 2, 1986 [FR] France ................. 86 07877

[51] Int. Cl.$^4$ ............................. G01V 1/00
[52] U.S. Cl. ........................... 364/421; 367/40
[58] Field of Search ............ 364/421, 21; 367/40, 367/41, 42, 59

[56] References Cited

U.S. PATENT DOCUMENTS

| 4,316,266 | 2/1982 | Barbier | 367/41 X |
|---|---|---|---|
| 4,403,312 | 9/1983 | Thomason | 367/40 X |
| 4,403,313 | 9/1983 | Garotta | 367/40 X |
| 4,736,347 | 4/1988 | Goldberg | 364/421 X |

Primary Examiner—Jerry Smith
Assistant Examiner—Steven G. Kibby
Attorney, Agent, or Firm—Blakely, Sokoloff, Taylor & Zafman

[57] ABSTRACT

The invention relates to a method and apparatus for processing data from a seismic survey.

In accordance with the invention, the data is regrouped to form a plurality of seismic images (A1, A2, A3, B1, B2, B3, C1, C2, C3). These images being defined by image elements defined in spatial position with respect to an operation direction (D) and having a grey level of predetermined amplitude, the method consisting for each pair of images (Ai,Bj) of carrying out processing by correlation of the amplitude of the grey levels, in order to establish an intercorrelation coefficient and to compensate the localization errors in the position of the images.

Application to mono-, bi- or tri-dimensional marine geophysical prospecting.

14 Claims, 5 Drawing Sheets

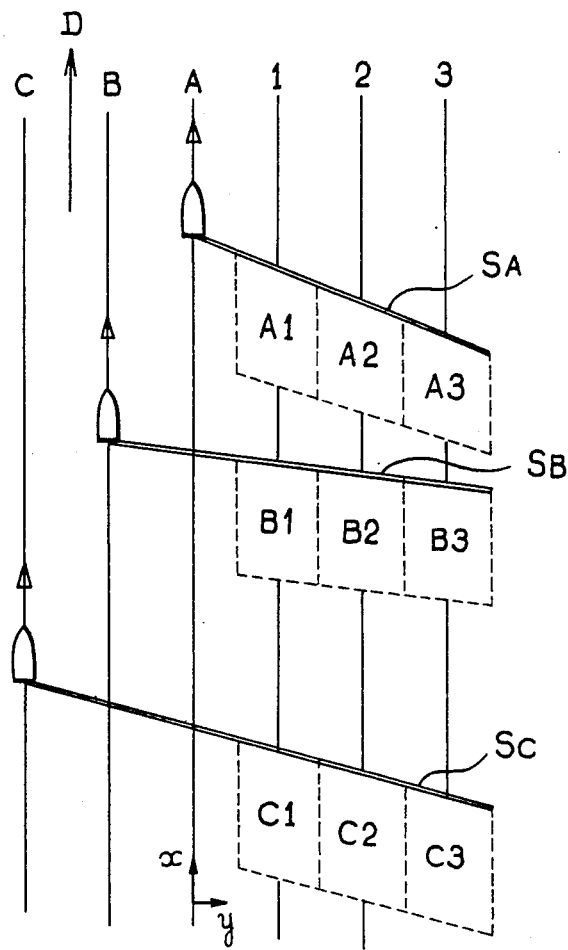
FIG_1

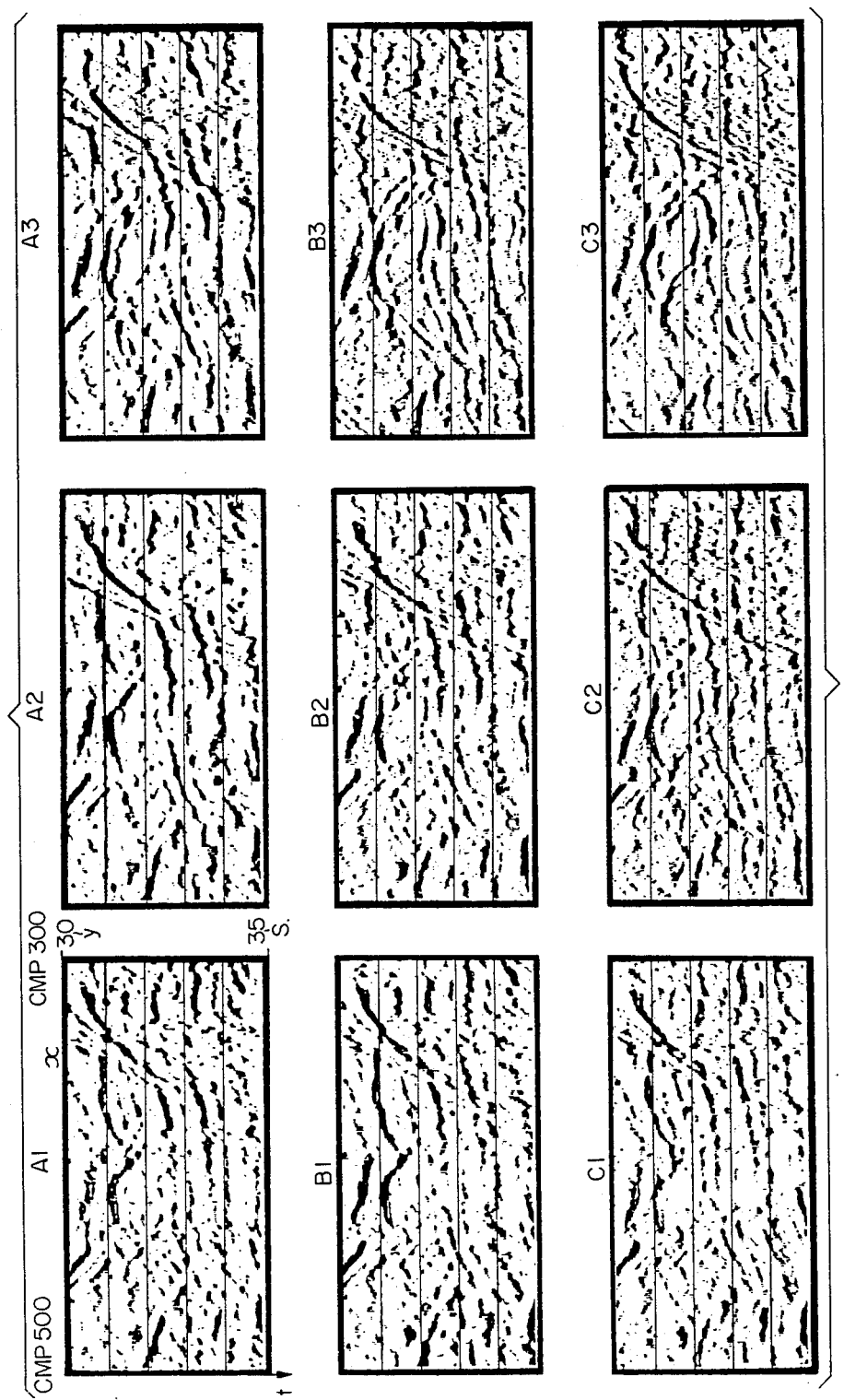
FIG_2

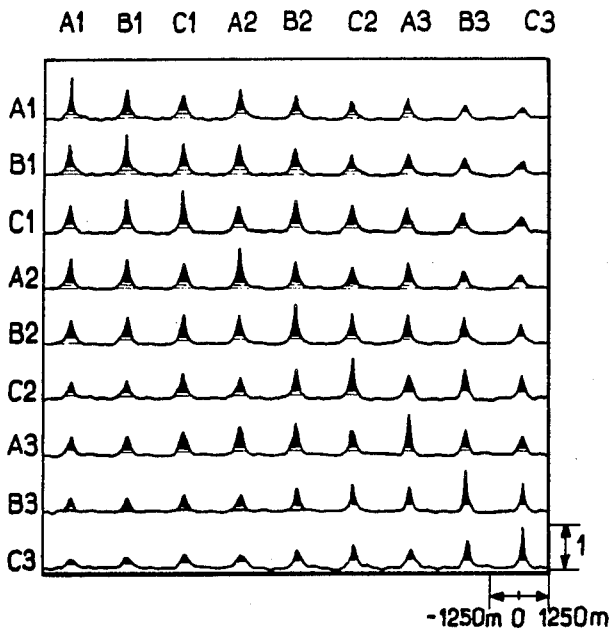
FIG_3a
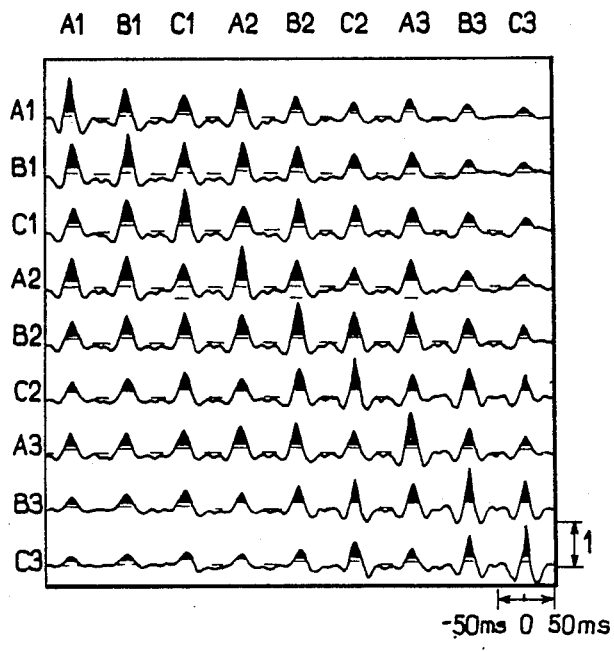
FIG_3b

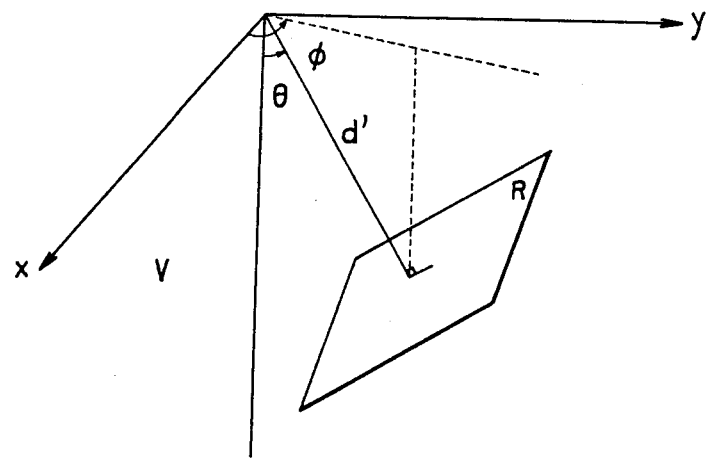
FIG_3c
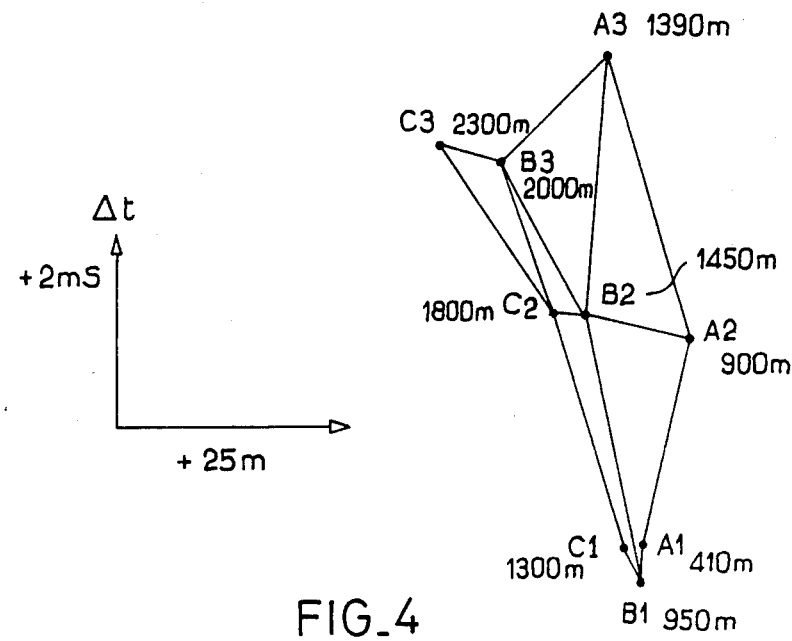
FIG_4

$$d_{ij} = \sqrt{\frac{1}{P^2} - B_0}$$

|    | A1 | B1   | C1   | A2   | B2   | C2   | A3   | B3   | C3   |
|----|----|------|------|------|------|------|------|------|------|
| A1 |    | 0,88 | 1,34 | 0,84 | 1,49 | 2,25 | 3,75 | 3,04 | 3,79 |
| B1 |    |      | 0,69 | 0,86 | 1,09 | 1,70 | 2,51 | 2,60 | 3,32 |
| C1 |    |      |      | 1,19 | 0,72 | 1,20 | 1,34 | 1,97 | 2,80 |
| A2 |    |      |      |      | 0,97 | 1,67 | 1,91 | 2,13 | 2,72 |
| B2 |    |      |      |      |      | 0,78 | 0,98 | 1,31 | 2,05 |
| C2 |    |      |      |      |      |      | 1,39 | 0,86 | 2,43 |
| A3 |    |      |      |      |      |      |      | 1,24 | 2,02 |
| B3 |    |      |      |      |      |      |      |      | 0,93 |
| C3 |    |      |      |      |      |      |      |      |      |

METHOD AND APPARATUS FOR PROCESSING SEISMOGRAPHIC DATA BY CORRELATION

FIELD OF THE INVENTION

The invention relates to a method and to an apparatus for processing data from a seismographic survey by common midpoint gathering.

BACKGROUND OF THE INVENTION

A seismic operation to establish a seismographic survey is characterised geometrically by position parameters of the source and of the receiver. These parameters are four in number in the case of a conventional operation carried out in the plane of the earth's surface. From the signals received by the receiver, an echo is obtained which is a function of time and position parameters relating to the source-receiver, variables x,y, depth z, as a function of the different geological strata.

Generally, a strong redundancy of instantaneous measurements is thus obtained which can be used in accordance with the method known under the name multiple covering. The multiple covering method permits focussing the reception of signals on predetermined geological levels or strata and it is thus possible to reduce the level of undesirable signals with respect to actual reflections. The multiple covering method thus consists of regrouping signals for which the mid points of the segment connecting the source and the receiver are identical.

This regrouping is carried out in a purely fictitious manner by suitable selection of values of corresponding registered data. For obtaining good results, the operation of this method of multiple covering processing presupposes the perfect positioning of the source and of the receiver as well as the validity of the theoretical notion of the mid point. Very significant difficulties in the perfectly exact positioning of the source and of the receiver can appear, particularly in the case of seismic surveys obtained by marine prospecting when the or each of the receivers used are secured to a floating cable towed by a boat. Further, the notion of the mid point appears valid only in rare situations, the notion of the mid point being invalidated in the case where the mirror image point of reflection of the pressure waves considered has a slope or dipping.

Although there has at present been proposed a dipping correction by applications of predetermined space and time corrections by means of simple mathematic functions, these cannot pretend to permit obtaining specific results at the reflection point considered.

SUMMARY OF THE INVENTION

The method and apparatus of the invention have the object of remedying the mentioned inconveniences.

Another object of the present invention is to provide a method and apparatus for treatment of seismographic data permitting, for true position variables of the source and of the receiver or receivers, determining the position error of the mid point, or statistical reflector, independently of unknown parameters of the actual dipping of the reflection point.

Another object of the present invention is on the contrary the provision of a method and apparatus permitting for a variable true position of the mid point, the determination of the position of the source and of the associated receiver or receivers.

Another object of the present invention is also a summation of the amplitude levels of the image elements constituting a plurality of predetermined distinct seismic images by an intercorrelation processing, for obtaining manifest reductions of the signal to noise ratio of the resultant images obtained.

The method of processing of seismographic survey data via multiple covering in accordance with the invention, in which the surveyed data is regrouped for forming a plurality of images, is remarkable in that the images being defined by the image elements defined in spatial positions with respect to an operation direction and having a predetermined amplitude level, is remarkable in that it consists, for each pair of images of carrying out a processing by correlation of the amplitude level of the corresponding image elements, in a manner to establish between two distinct images an intercorrelation coefficient in order to compensate the localisation errors in the position of the said images.

The method and apparatus according to the invention find application in one-, two- or three-dimensional land or marine geophysical prospecting.

BRIEF DESCRIPTION OF THE DRAWINGS

Other characteristics of the method and of the apparatus for processing seismic survey data will appear from reading the description and studying the drawings in which:

FIG. 1 shows by way of non-limitative example a plan view of a marine geophysical prospecting operation in a seismographic survey.

FIG. 2 shows a series of seismic images obtained in the operation shown in FIG. 1, FIG. 3a shows an array of values of coefficients of spatial intercorrelation for each pair of seismic images, FIG. 3b shows an array of values of time intercorrelation coefficients for each pair of seismic images, FIG. 3c shows the orientation or dipping parameters of a reflector with respect to the seismic source, FIG. 4 shows a diagram of spatial position and time deviation obtained from the different intercorrelation coefficients.

DETAILED DESCRIPTION

Figures 5A, 5B:
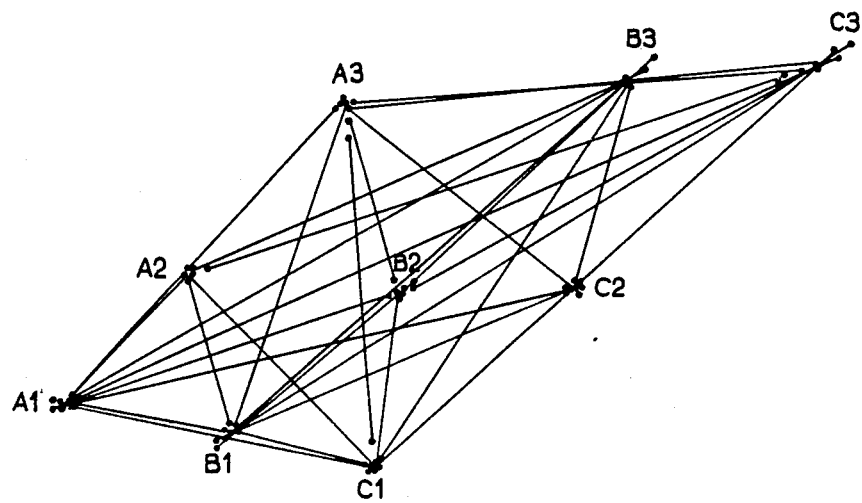
FIG. 5a shows an array of coefficient values for dissimilarity between two distinct images and FIG. 5b shows a two-dimensional diagram in which the coefficient of dissimilarity between two corresponding images is associated with a corresponding distance.

The invention will now be described in connection with FIG. 1.

The method of multiple covering seismographic survey, by putting (or gathering) in common mid point consists of forming a plurality of images from the survey data regrouped in an arbitrary manner. The images are defined by the image elements defined in spatial position with respect to an operating direction and having a predetermined amplitude level. Of course, in order to ensure a visualisation of the levels of echo signal delivered by the receiver following excitation after the firing of the source, these amplitude levels of echo signal delivered by the receiver can be converted after correlation in a grey level according to a scale or an arbitrary colour.

In accordance with an advantageous characteristic of the method of the invention, this consists, for each pair of images, of carrying out a processing by correlation of the amplitude levels of corresponding image elements, in a manner to establish between two distinct images a coefficient of intercorrelation in order to compensate particularly the errors of positioned localisation of the mentioned images.

According to another advantageous characteristic of method according to the invention, the processing by correlation can consist of a processing by spatial correlation in at least one spatial position dimension for the image elements considered. As conventionally, the spatial correlation will be able to be carried out with respect to a dimension parallel to the mentioned operating dimension.

According to another advantageous characteristic of the method according to the invention, the processing by correlation can consist of a processing by space-time correlation, according the time dimension of the said image elements.

Further, according to the method of processing of seismographic survey data according to the invention, following the mentioned processing by correlation, the method can consist of determining space-time displacements between each couple of images then applying these displacements to values representative of the amplitude levels of the image elements considered and adding the corresponding values after the displacement for each pair of images in order to reduce the resultant signal to noise ratio.

The method of processing of seismographic survey data according to the present invention can advantageously be used for processing of seismographic survey data obtained by widely different seismographic operations.

The method generally consists of regrouping a small number of amplitude level signals relative to a trace, the signals being taken in a small time duration, for example a duration of 100 ms, allowing one for example of the position parameters to vary and fixing the others. A small seismic image in two dimensions is thus obtained. Two position parameters can also be allowed to vary, for example in accordance with a first direction parallel to the operating direction and in a second direction perpendicular to this first direction whilst holding constant the other parameters. A small seismic image in three dimensions is thus obtained.

EMBODIMENT OF THE INVENTION

The method according to the invention will now be more particularly described in an advantageous, non-limitative manner in the case of a three-dimensional processing of data from a marine seismographic survey in connection with FIG. 1.

As appears in this Figure, the data obtained from a plurality of N acquisition lines designated A, B, C, permits definition of n mean lines of mid points designated, 1, 2, 3, 1 to n, equidistant with respect to a moving seismic source. The moving seismic sources are for example carried by ships moving at a substantially uniform speed on the acquisition lines designated A,B,C in an operating direction designated D. A plurality of receivers or geophones are arranged on a prospecting cable designated SA, SB, SC, each prospecting cable being towed by a ship on the corresponding acquisition line. The mean lines of equidistant mid points 1 to n and more particularly designated 1,2,3 on FIG. 1, are thus substantially defined as a geometric locus of mid points between the corresponding seismic source carried by the ship on the acquisition line considered and a geophone or receiver carried by the corresponding prospecting cable SA, SB, SC. The acquisition cables SA, SB, SC are represented with a derivation or orientation with respect to the operating direction D, accentuated in order not to obscure the clarity of the drawing. On displacement of the ship on each acquisition line A,B,C, the seismic echo zones covered by each acquisition cable SA,SB,SC with respect to the mean lines of mid points 1 to n and respectively 1,2,3 are designated A1,A2,A3,B1,B2,B3,C1,C2,C3. The signals generated by the echoes corresponding to the mentioned zones can then be regrouped for forming a plurality of images A1,A2,An; B1,B2,Bn; C1,C2,Cn, as shown in FIG. 2. The mentioned images can be parameterised in position with respect to the variable positions x and y, the variable x being substantially parallel to the operating direction D or the acquisition lines A,B, and C and the variable y corresponding to a direction perpendicular to the direction x. In FIG. 2, it will be noted, as is shown relative to the image A1, that each image is thus parameterised in a variable position by the variable x parallel to the operating direction D, the variable y which in fact represents the distance separating two image elements normally occupying the same position in two successive seismic images relative to two mean lines of successive mid points, and a time parameter corresponding in fact to the time of propagation and/or of acquisition of data following seismic firing of each source. Thus, in FIG. 2, the seismic images A1,A2,A3, B1,B2,B3, C1,C2,C3 correspond to partial images coming from three acquisition lines A,B,C and spaced on three mean lines of equidistant mid points 1,2,3 "bin lines" spaced for example at 75 meters.

The conventional processing of seismic images such as shown in FIG. 2, images A1,A2,A3,B1,B2,B3,C1,C2,C3 consist of vertically summing the corresponding images A1,B1,C1, that is to say the images taken on each mid point mean line.

In contrast to the conventional method of processing of the mentioned three-dimensional type, the method according to the invention consists for each pair of images, Ai, Bj, independently of the mean line for the mid point concerned, of carrying out a processing by correlation of the amplitude level of the corresponding image elements. The mentioned processing by correlation permits establishment between two distinct images Ai, Bj, Ck, a coefficient of intercorrelation in order to compensate the correlation errors due for example to a localisation error of the prospecting cables.

Of course, in accordance with an advantageous non-limitative characteristic of the method according to the invention, the images Ai, Bj, Ck of which the intercorrelation coefficient is greater than a predetermined value, are summed in order to improve the signal to noise ratio. By summation of the images, is intended summation of the levels of amplitude of the corresponding image elements.

According to an advantageous characteristic of the method according to the invention, the processing by correlation consists of establishing between two distinct images Ai, Bj an intercorrelation coefficient in the form:

$$C\Delta x_{Ai,Bj} = \frac{\Sigma Ai(x - \Delta x) \cdot Bj(x)}{\Sigma Ai^2(x) + Bj^2(x)} \quad (I)$$

$$\text{or } C\Delta x_{Ai,Bj} = \frac{\Sigma Ai(x - \Delta x) \cdot Bj(x)}{\sqrt{\Sigma Ai^2(x) \cdot \Sigma Bj^2(x)}} \quad (I')$$

In the preceding equations, the terms $\overline{Ai}(x)$ and $\overline{Bj}(x)$ represent the amplitude levels on the x abscissa for the image considered.

It will be noted that the considered processing by correlation consists of a spatial correlation on the dimension x, a correlation in which the $\Delta x$ parameter represents the position deviation parameter between two image elements of the images Ai, Bj. Of course in order to obtain homogenous results, the intercorrelation coefficient can be normalised with respect to an auto-correlation coefficient for the images Ai, Bj as will appear in the preceding equation I. The spatial deviation for minimum correlation $\Delta x_M$ between two images Ai, Bj is obtained for a maximum intercorrelation coefficient $C\Delta x_{AiBj}$. Thus, in accordance with another characteristic of the method according to the invention, the correlation spatial deviation $\Delta x$ between two considered images can thus be applied to corresponding image elements and the amplitude level values of these images elements can then be summed to corresponding values of image elements of the pair of images considered, in a manner to carry out a summation in order to diminish the resultant signal to noise ratio. The summation can thus be carried out after displacement for the spatial deviation considered for successive images.

According to an advantageous embodiment of the method according to the invention, further to a spatial correlation, a time correlation can be carried out, the correlation between two images Ai, Bj of each pair of images being carried out in accordance with the previously described time parameter. In this case, the intercorrelation coefficient is of the form:

$$K\Delta x, \Delta t_{Ai,Bj} = \frac{\sum_x \sum_t (A(x - \Delta x, t - \Delta t)) \cdot B(x,t)}{\sum_x \sum_t A^2(x,t) + B^2(x,t)} \quad \text{(II)}$$

$$\text{or } K\Delta x, \Delta t_{Ai,Bj} = \frac{\sum_x \sum_t (A(x - \Delta x, t - \Delta t)) \cdot B(x,t)}{\sqrt{\sum_x \sum_t A^2(x,t) \cdot \sum_x \sum_t B^2(x,t)}} \quad \text{(II')}$$

In the preceding equations, the terms A(x,t) and B(x,t) represent the levels of amplitude on the x abscissa and of time t for the considered image. The space-time deviation designated $\Delta x_M$, $\Delta t_M$ of minimum correlation between two images Ai,Bj is obtained for a maximum intercorrelation coefficient $K\Delta x, \Delta t_{Ai,Bj}$. Of course, an analogous processing following determination of the space-time deviation between two images constituting a pair of images, then displacement of the corresponding space-time deviation can be carried out in order to establish a summation of corresponding images for obtaining a reduction of the resultant signal to noise ratio.

It will of course be understood that the spatial correlation in accordance with the variable x can be carried out for any value of the fixed time variable and vice versa, the time correlation can be carried out for any fixed value of the spatial variable x. Thus, the method according to the invention can be provided following a spatial and/or time correlation processing.

Study of the seismic images A1,A2,A3,B1,B2,B3,C1,C2,C3 shows that on the same mean line of mid points, the same "bin line", the three images are not identical. The reason for this fault between the images of the same line of mid points results from the variation of mean offset displacement between the seismic source and the receiver considered, the offset displacement being defined as half the distance between the seismic source and the receiver considered, this mean offset displacement corresponding in fact to a variation of the mid point considered. The absence of identity of seismic images from the same mean line of mid points A1,B1,C1 can also result from a position error in a direction perpendicular or transverse to the operating direction D, the direction y for example. This absence of identity can of course result from the combination of two of the mentioned reasons.

A theoretical study leading from a mathematical model in connection with the method according to the invention has shown that the space-time deviation $(\Delta x_M, \Delta t_M)$ for any two images Ai,Bj forming a pair of images, satisfies the equation:

$$\Delta t_M = a\Delta x_M + b\Delta y_M + c\Delta(h^2) + d\Delta\alpha \quad \text{(III)}$$

In fact, the notion of mid points is valid only if the reflectors or reflection points of the seismic wave generated for carrying out the operation are horizontal. If they are inclined in a direction, the best correlation is obtained for a $\Delta x$ or spatial correlation deviation connected to a dispersion crossing with the offset, a DIP MOVE OUT dispersion. This dispersion does not depend on a surface position error. For a set of reflectors or aleatory reflection points, there appears a term or bias connected to the mean DIP MOVE OUT. The spatial correlation deviation $\Delta x$ determined in accordance with the method according to the invention then contains a spatial correlation deviation connected to the position error and the spatial correlation deviation connected to the statistics for dipping of the reflectors or points of reflection. In the preceding equation III, such as verified by the space-time deviation $\Delta x_M \Delta t_M$ for any two images Ai,Bj, forming a pair of predetermined images, $\Delta t_M$ represents the time correlation deviation for the two images considered, $\Delta x_M$ represents the spatial correlation deviation in the direction x, $\Delta y_M$ represents the mid points deviation on the direction y, $\Delta(h^2)$ represents the mean offset deviation for the two images considered, and $\Delta\alpha$ represents the deviation derived from prospecting cables, the derivation having been defined as previously.

In FIGS. 3a and 3b has been shown the value of intercorrelation coefficients between the pairs of images, the intercorrelation coefficient for each pair of images formed by two identical images corresponding in fact to the maximum value for auto-correlation coefficient normalised to 1. In FIG. 3b, has been shown the values of time intercorrelation coefficients, for each of the pairs of considered images Ai, Bj, Ck.

In the equation previously mentioned, the parameters a,b,c,d are parameters connected to the cosine director to the mid points considered of the corresponding reflector. In FIG. 3c, the reflector designated R has been shown, as well as the cosine directors $\phi\theta$, of the normal to the reflector.

The parameter a meets the equation:

$$a = -2/V \sin\theta \cos\phi.$$

The parameter b meets the equation $$b = -2/V \sin\theta \sin\phi.$$

The parameter c meets the equation:

$$c = 1/Vd\{1 - V^2/V_*^2 - \sin^2\theta \cos^2(\phi - \alpha_0)\}.$$

The parameter d meets the equation:

$$d = -h_o^2/Vd' \sin^2 \theta \sin^2 (\phi - \alpha_0).$$

In the preceding equations met by the parameters a,b,c,d, V represents the mean quadratic speed of the seismic wave with respect to the reflector, V* represents the speed corrected after dynamic correlation as a function of the receiver considered, $\alpha_0$ represents an arbitrarily derived mean value.

According to an advantageous characteristic of the method according to the present invention, which further consists for at least each of the spatial deviation values $\Delta x_M$ and or time $\Delta t_M$ of correlation relative to any two images Ai,Bj each forming a pair of images, to range the said intercorrelation coefficients, coefficient such as $C\Delta x_{Ai,Bj}$ and $K\Delta x\Delta t_{Ai,Bj}$, in order to form for each an array of values. The arrays of values can for example consist of arrays obtained in accordance with the method already indicated and shown in FIGS. 3a and 3b. The method further consists in establishing for each pair of images Ai,Bj a representative deviation diagram for each image Ai,Bj in a space $\Delta t_M, \Delta x_M$ and mean values of offset for each image considered. Such a diagram is shown in FIG. 4 in a corresponding plane $\Delta t$, $\Delta x$ where the values $\Delta t_M, \Delta x_M$ are shown. In the diagram shown in FIG. 4, it will be noted that the points A3,B2 and C1 which have neighbouring offset values have a spatial correlation deviation $\Delta x_M$ less than 5 meters. The dispersion or "DIP MOVE OUT" term being substantially neighbouring in the three cases corresponding to the images A3,B2 and C1, one can conclude that the x positioning is exact. In the same manner, as concerns the images A1,B1,C1, which have offsets of low but different values, these are closely neighbouring and it is improbable that the possible position error is exactly compensated by the dipping term. As concerns the seismic image C3 for which the offset is 2300 meters, the point representative of the image considered is to the left of B3 for which the offset is 2000 meters, then for C2 of which the offset is 1800 meters and B2, 1450 meters, A3 1390 meters, C1 1300 meters, A2 and B1 900 meters and A1 410 meters. This bias is further confirmed by its sign with the mean direction of dippings stated on the section. The reflection point rises up the dipping with the offset.

It will be noted also that the seismic images are regrouped on mean lines of mid points or "bin lines" on the level of time displacements: line 1 below, line 2 in the middle, line 3 above with a displacement of approximately 2 ms.

Consequently, the images of which the mean offset values are neighbouring are determined by a substantially aligned positioned with respect to the dimension $\Delta t_M$, images A3,B2,C1 on FIG. 4.

It will of course be understood that the deviation chart shown in FIG. 4 can be established in a graphical manner, as shown in FIG. 4 or by any calculation program permitting a tri program for example, the range of corresponding values of space or time correlation deviation $\Delta x_M, \Delta t_M$.

According to another particularly advantageous aspect of the method in accordance with the invention, in order to determine position information relative to seismic images Ai,Bj on the direction y transverse to the operating direction, the method consists for each pair of images Ai,Bj of establishing a dissimilarity coefficient designated $\Delta_{ij}$ according to the equation:

$$d_{ij} = \sqrt{1/\rho^2 - B_o} \quad \text{(IV)}$$

In this equation, $\rho$ represents the value of the spatial intercorrelation coefficient $C\Delta x_{Ai,Bj}$ for example, and Bo an arbitrary constant value representative of the mean noise value of image elements of images Ai,Bj. In the seismic operation carried out in accordance with the method according to the invention, the value of Bo has been taken in an arbitrary manner to be 1.25. Further, following the establishment of the dissimilarity coefficients $d_{ij}$ relative to each pair of images Ai,Bj, the method in accordance with the invention consists of forming from the values $d_{ij}$ of the dissimilarity coefficient a two-dimensional diagram, said diagram consisting of associating to each image Ai,Bj and to each pair Ai,Bj the corresponding coefficients $d_{ij}$ assimilated to the distance between the points Ai and Bj.

In the particular case of images A1,B1,C1,A2,B2,C2,A3,B3,C3 nine points are then arranged of which the distances between each pair are known.

A graphic representation in which a plan of points corresponding to the mentioned images Ai,Bj and their respective distance, permits showing the diagram such as shown in FIG. 5b. A diagram is thus obtained in which all the distances are shown with precision, distributing the errors in a homogenous manner to each of the points. In the example shown in FIG. 5, the distance A2,B1 becomes 0.66, half the distance A3,C1 which becomes 1.34 and so on. The coherence of 36 pieces of distance data is very good and it appears only slightly sensitive to the sole parameter of the level of noise Bo introduced. Each of the points being connected to eight others by a distance, one then finds eight values for each image position. It is in fact remarkable that even the large distances A1,C3 for example corresponding to an intercorrelation coefficient of 0.25 according with the shorter distances B3,C3 for example, where the intercorrelation coefficient becomes 0.69.

Further, the diagram of points obtained is distributed in a logical order, the offset values crossing from left to right.

A model of the aleatory orientation of the reflectors shows that the population of time correlation deviations $\Delta t$ which separates two seismic images has a variance which can be interpreted as the square of a distance in a non orthonormated space where the axes represent the offset of the square on the one hand, and the y position on the other hand. In will be noted that the unit of measurement on each of the axes, as well as the angle which they form between themselves, is connected to the statistical parameters of the distribution of the reflectors. It is noted that on the experimental diagram, that the detail of the true value of the offsets is found on this. One can then identify the alignments A3,B3,C3,A2,B2,C2 and A1,B1,C1 with the value of y, respectively of 150, 75 and 0 meters and conclude that the regrouping obtained in common mid points was correct.

It will also be noted that the lines A3,B3,C3,A2,B2,C2 and A1,B1,C1 are not parallel but converge substantially. From the topographical point of view, this can be explained by a correct derivation on the acquisition line A, stronger than that provided on the acquisition line B and even stronger than that provided on the acquisition line C. A study of these diagrams in other time windows of the same place has shown that this bias is in fact not repeated and that on average the three lines are substantially parallel, suggesting a correct putting in common topographic mid points.

The method of processing of data from a seismographic survey in accordance with the invention can advantageously be provided by means of a processing apparatus, comprising a computer permitting the establishment of all the space-time intercorrelation coefficients for each pair of images Ai,Bj and the dissimilarity coefficient $d_{ij}$. The computer can comprise a permanent memory having a calculation program for all the mentioned coefficients and parameters.

There has thus been described a method and device for processing data from a seismographic survey with a particularly good performance and remarkable in that it first permits verification that the seismic images can be arranged in a plane and that a distance can be introduced between them, which distance is introduced from a correlation processing of pairs of images formed of two distinct images.

I claim:

1. A method of processing data from a seismographic survey by common mid-point gathering in which said data are regrouped to form a plurality of images, wherein said images are defined by image elements defined in spatial position with respect to an operating direction and having a level of predetermined amplitude, said method comprising, for each pair of images, processing by correlation of the amplitude level of said corresponding image elements in order to establish an intercorrelation coefficient for at least one pair of said images in order to compensate for positioning errors of said images.

2. A method according to claim 1, wherein said processing by correlation is a processing by spatial correlation on at least one spatial position dimension of said image elements.

3. A method according to claim 1, wherein said correlation processing is a processing by space time correlation in the time dimension of sad image elements.

4. A method according to claim 1, wherein following said correlation process, said method consists of determining space-time displacements between each pair of images, applying said displacements to values representative of amplitude levels of said image elements considered and summing said corresponding values after displacement for each image pair in order to reduce the signal to noise ratio of the resultant image.

5. A method of three-dimensional processing of marine seismographic survey data by common mid-point gathering, comprising the steps of:
obtaining said data from one of a plurality of N acquisition lines permitting definition of n mean lines of substantially equidistant mid points (1 to n) with respect to a moving seismic source, on one operating direction, on each acquisition line and to a plurality of geophones arranged on a prospecting cable associated with each said source;
grouping said data to form a plurality of images (A1, A2, ... An); (B1, B2 ... Bn); (C1, C2, ... Cn) wherein said images (Ai,Bj,Ck) are defined by image elements for an x abscissa in a direction substantially parallel to said operating direction at a given time t, and having a respective amplitude level $Ai_{(x,t)}$ $Bj_{(x,t)}$, $Ck_{(x,t)}$;
correlating by amplitude level between corresponding image elements, in order to establish between two distinct images chosen from the group Ai,Bj,Ck an intercorrelation coefficient so as to compensate for data errors due to error in the positioning of said cables.

6. A method according to claim 5, wherein said images Ai, Bj, Ck of which said intercorrelation coefficient is greater than a predetermined value are summed in a manner to reduce the signal to noise ratio.

7. A method according to claim 6, wherein in order to determine position information relating to images Ai, Bj on said direction y transverse to said operating direction, said method consists, for each couple of images Ai, Bj of:
establishing a dissimilarity coefficient $d_{ij}$ satisfying the equation:

$$d_{ij} = \sqrt{1/\rho^2 - Bo}$$

in which $\rho$ represents a value of said spatial intercorrelation coefficient $C\Delta x_{Ai,Bj}$ and Bo represents an arbitrary constant value representative of the mean signal to noise ratio for image elements of said images Ai, Bj,
forming from values $d_{ij}$ of said dissimilarity coefficient, a two-dimensional diagram, said diagram consisting of associating with each image Ai, Bj, and each pair of images Ai,Bj said corresponding coefficients $d_{ij}$ assimilated to distance between said points Ai and Bj.

8. A method according to claim 5, wherein said correlation processing consists, between two distinct images Ai, Bj of establishing an intercorrelation coefficient of a form:

$$C\Delta x_{Ai,Bj} = \frac{\Sigma Ai(x - \Delta x) \cdot Bj(x)}{\Sigma Ai^2(x) + Bj^2(x)}$$

said correlation processing consisting of a spatial correlation on the x dimension.

9. A method according to claim 8, wherein spatial deviation for minimum correlation ($\Delta x_M$) between two images Ai,Bj is obtained for a maximum intercorrelation coefficient $C\Delta x_{Ai,Bj}$.

10. A method according to claim 8, wherein further to a spatial correlation, a time correlation is carried out, said intercorrelation coefficient being of a form:

$$K\Delta x, \Delta t_{Ai,Bj} = \frac{\sum_x \sum_t (A(x - \Delta x, t - \Delta t)) \cdot B(x,t)}{\sum_x \sum_t A^2(x,t) + B^2(x,t)}$$

a space-time deviation ($\Delta x_M, \Delta t_M$) for minimum correlation between two images Ai, Bj being obtained for a maximum intercorrelation coefficient $K\Delta x, \Delta t_{Ai,Bj}$.

11. A method according to claim 10, wherein said space-time deviation ($\Delta x_M, \Delta t_M$) for any two images Ai, Bj satisfies an equation:

$$\Delta t_M = a\Delta x_M + b\Delta y_M + c\Delta(h^2) + d\Delta\alpha$$

in which a,b,c, and d are parameters connected to director cosines of said considered mid point, $\Delta y_M$ represents deviation of two mid points on said direction y, $\Delta(h^2)$ represents offset deviation between two images considered, and $\Delta\alpha$ represents deviation derived from relative prospection cables to acquisition lines Ai, Bj respectively.

12. A method according to claim 10, wherein said method consists further for at least each of said values of spatial $\Delta x_M$ and/or time $\Delta t_M$ deviation for correlation, relative to any two images Ai, Bj, of:

arranging said intercorrelation coefficients $C\Delta x_{Ai,Bj}$ and $K\Delta x, \Delta t_{Ai,Bj}$ in a manner to form for each an array of values, establishing for each pair of images Ai, Bj a representative deviation diagram for each image Ai, Bj in a space $\Delta t_M$, $\Delta x_M$ and mean values of offset for each image.

13. A method according to claim 12, wherein said images of which the values of mean offset are neighbouring, are determined by a position substantially aligned with respect to said dimension $\Delta t_M$.

14. A device for processing seismographic survey data comprising:

computing means for grouping said data to form a plurality of images, said images being defined by image elements, said image elements being defined along a spatial axis, said axis being substantially parallel to an operating direction, said image elements having a level of predetermined amplitude, and for correlating by amplitude level between corresponding image elements in each of said pair of images so as to establish an intercorrelation coefficient to compensate for positioning errors of said images;

permanent memory means coupled to said computing means for storing a set of instructions, said computing means utilizing said instructions to accomplish said grouping and said correlating operations.

* * * * *